Dec. 10, 1957  O. MITCHELL  2,815,524
MOWER ROLLER SCRAPER
Filed July 26, 1954
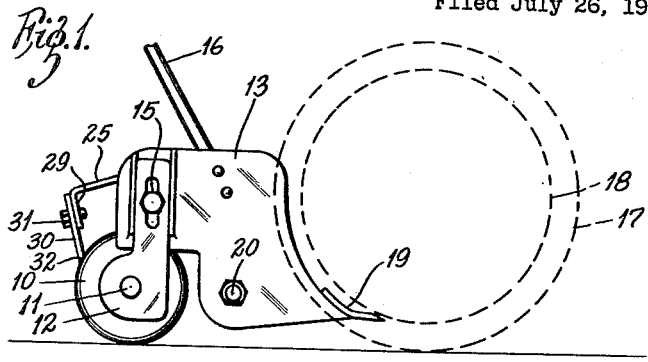
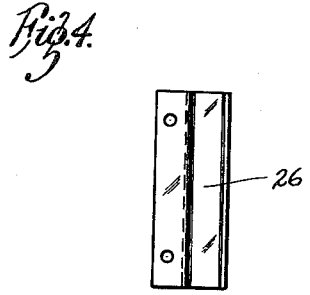
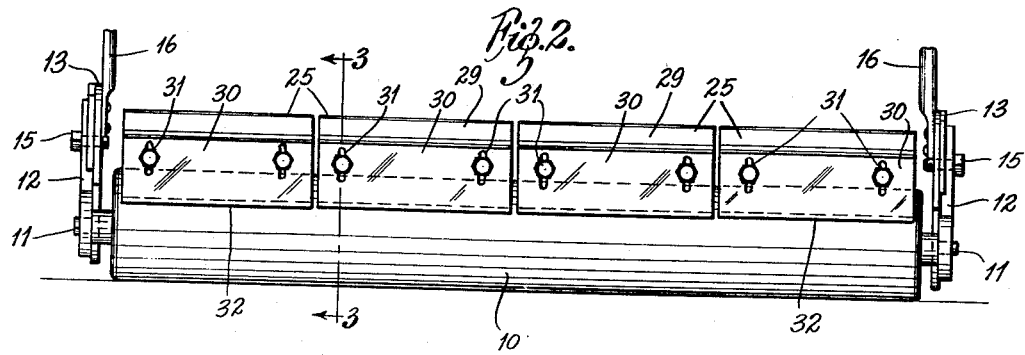
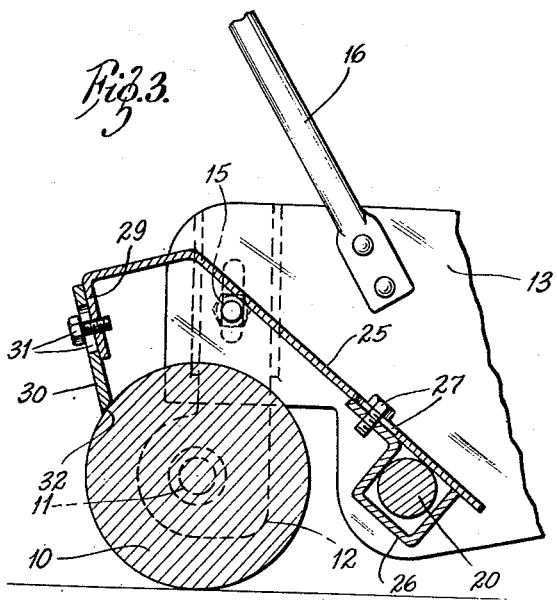
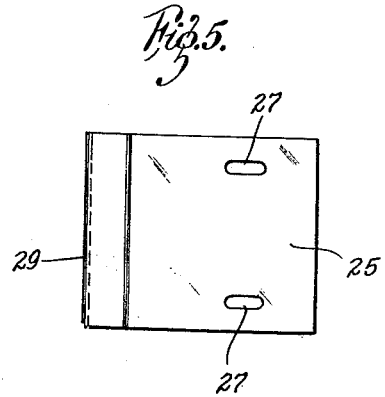
INVENTOR:
ORVILLE MITCHELL
BY Kingsland, Rogers & Ezell
ATTORNEYS

# United States Patent Office 2,815,524
Patented Dec. 10, 1957

2,815,524

MOWER ROLLER SCRAPER

Orville Mitchell, Dallas, Tex., assignor to John E. Mitchell Company, Dallas, Tex., a corporation of Missouri Application July 26, 1954, Serial No. 445,653

5 Claims. (Cl. 15—256.5)

The present invention relates to a mower roller scraper. Lawn mowers usually have a grass roller located back of the cutting means. Frequently, this roller is vertically adjustable and constitutes the means to regulate the height of the grass cut by the mower.

One difficulty in using a mower with such a roller occurs when the grass is wet or otherwise sticky. The cuttings collect on the roller and build up to such an extent that the mower cuts unevenly. Such a thing is especially critical in mowing golf greens or other places where evenness is required. But in all cases, it becomes a problem because it can interfere with the efficient cutting of the grass, or with the mechanical operation of the mower itself.

Heretofore, the problem has been attacked, but no one has been able to solve it with an apparatus that is both simple to manufacture and install, efficient in operation, and not too expensive.

The present invention consists of a plurality of scraper elements located across the roller. They are all gravity-held against the roller to perform their scraping function. No springs or other means are required to actuate them. They are self-adjusting to irregularities in the roller and some adjustments of the roller height, and can be adjusted to accommodate rollers of different sizes or variants in the mounting arrangements.

It has been found that with the present scrapers the actual time during which mowing can be done on golf courses is increased by one-third to one-half, because the mowers can be operated in the early morning when the dew is still heavy on the grass, as well as after dew falls in the evening.

In the drawing:

Figure 1 is a side elevation of the back parts of a mower, with the present invention in place and with the reel and wheel of the mower shown in broken lines;

Figure 2 is a rear elevation of the scraper in place on a roller;

Figure 3 is a front-to-rear section taken on the line 3—3 of Figure 2;

Figure 4 is a plan view of one of the adjustable brackets employed in mounting the invention; and Figure 5 is a face view of one of the scraper supporting plates.

Figure 1 is designed to illustrate a typical roller mounting for a mower, here illustrated as a reel-type mower. The roller 10 is mounted by spindles 11 in vertically adjustable brackets 12 that are attached to side frame elements 13. The attachment illustrated consists of having the upper shank parts of the members 12 fit within guides on the members 13, with attachment by a nut and slot arrangement 15. Obviously, this is merely one of the several methods conventionally used for providing vertical adjustment of the roller 10.

The lower ends of the mower handle are indicated at 16.

The outer dashed circle is designed to illustrate the two main mower wheels 17; and the inner dashed circle is designed to indicate the reel 18. A cutter blade 19 is more or less diagrammatically illustrated as being mounted across between the side frame elements 13 for cooperation with the reel 18. These parts are described diagrammatically, since, in detail, they form no part of the present invention.

Conventionally, mowers have a tie rod 20 that extends across between the two side frame elements 13 in front of the roller 10 but behind the reel. The present invention is designed to be mounted on this tie rod 20.

The scrapers of the present invention include a plurality of scraping elements disposed across the roller 10. It has been found that the rollers are irregular, and any effort to make one scraper that extends across even as much as half of the ordinary roller for a mower of 20" width or greater is unsuccessful. It is practically impossible to make a scraper that conforms to the surface of the roller over such a length, because of the irregularities of the roller itself. This foregoing condition is aggravated by irregularity of wear of the roller in use. It has been found that there should be at least four such scrapers for a mower of ordinary width, and that in general no scraper should be wider than about seven inches.

Each individual scraper element includes a supporting plate 25. This plate is attached to the rod 20 by a bracket 26. The bracket is adjustable with respect to the plate 25, by means such as the two screw and slot attachments 27. The bracket 26 should be large enough to fit fairly loosely on the rod 20 so as to permit a free and untrammeled rocking movement of the plate 25 about the rod 20.

The plate 25 extends upwardly and backwardly from the rod 20, and thence is bent somewhat downwardly over the top of the roller, and terminates in an almost vertical rear edge 29 above the roller. This rear edge extends downwardly in a direction that is actually back of the axis of the roller. A scraper blade 30 is attached to the edge 29 by a pair of screw and slot connections 31 that provide adjustment of the blades. The lower scraping edge 32 of the blade 30 is tapered so that it can engage the surface of the roller 10 with a scraping knife-edge contact. This arrangement also makes the blades self-sharpening.

These parts are made out of relatively heavy steel plate material, so that there is a substantial gravity force tending to swing the scraper elements counterclockwise as illustrated in Figure 3, to cause engagement of the scraper edges 32 against the roller 10.

*Use and operation*

A plurality of the scrapers are mounted on the rod 20 by loosening their screw and slot connections 27 so that the brackets 26 may be disposed around the rod. Then the connections are partially tightened so that the plates 25 are held in position. The scraper blades 30 are mounted on the down-turned edges 29 of the plates 25, with the screw connectors 31 more or less loose.

Then the parts are adjusted by moving the plates 25 toward or from the rods 20, and by adjusting the scraper blades 30 up and down, until they occupy the positions more or less as illustrated in Figure 3. The plates 25 should be moved until the blades 30 are back of the axis of the roller 10 by a substantial distance. By this arrangement, the movement of the surface of the roller 10 is upwardly against the scraping edge 31, without too great a component tending to push the blades 30 forwardly of the mower. The engagement of the edge 32 and the roller should preferably be about 30–45° above horizontal. This prevents the blade from slipping down, if it is not perfectly adjusted and secured, and yet holds the forward component of roller reaction on the blade small. Consequently, the force producing the scraping is primarily that of gravity and there is not a tendency to wrap the blades 30 in under the overhanging part of the plate 25, which would destroy the device.

The adjustment of the blades 30 up and down by the adjustment 31 can change the angle of engagement of the tapered cutting edge 32 with the roller.

It will be seen that these blades are self-sharpening by the frictional engagement of the roller with the cutting edges.

With the foregoing arrangement, the roller can be kept scraped and, in actual use, is maintained clean, polished and free of foreign matter. Yet the device has a minimum of parts and is designed to practically eliminate the possibility of breakage in use.

What is claimed is:

1. A scraper for the roller of a lawn mower, which mower has side frames, a roller between the frames, and a cross rod between the frames ahead of the roller, the scraper comprising: a support having a bearing at a forward edge for freely rockably mounting the support on the cross rod, the support being of a shape to extend backwardly over the roller, and a scraper blade extending downwardly at the rear of the support, with a scraper edge engageable against the surface of the roller behind the axis of the roller, the shape of the support and blade being such as to urge the scraper edge against the surface of the roller at a shallow angle so that the force of the roller surface on the scraper is in a direction generally tangential of the arc of rocking of the blade and support about the bearing on the cross rod.

2. The device of claim 1, wherein the blade is attached to the support in a position to extend approximately vertically toward the roller, with means for adjusting the blade in a vertical direction with respect to the support.

3. The device of claim 1, wherein the support and bearing are relatively adjustable for adjusting the position of the blade forwardly and backwardly relatively to the bearing at its forward edge.

4. The device of claim 1, wherein said scraper blade includes a plurality of scrapers disposed side by side across the roller, each being no more than about seven inches wide.

5. The device of claim 1, wherein the support, adjacent the bearing, extends upwardly and backwardly, then downwardly and backwardly, to pass over the roller, and then extends downwardly and generally vertically toward the roller; wherein the scraper blade is secured adjustably to the last-named vertically extending portion, for adjustment toward and from the roller; and wherein the bearing includes a bracket-like piece engageable around the rod, and adjustably secured to the support.

References Cited in the file of this patent

UNITED STATES PATENTS

| 1,415,859 | Bates | May 16, 1922 |
| 2,113,614 | Dornbusch | Apr. 12, 1938 |
| 2,729,333 | Gardes | Jan. 3, 1956 |

FOREIGN PATENTS

| 270,946 | Great Britain | May 19, 1927 |